Jan. 31, 1928.　　　　　　　　　　　　　　　　　　1,657,601
C. E. H. ARMBRUSTER
DYNAMIC PHOROPTOMETER
Filed May 24, 1926　　　　3 Sheets-Sheet 3
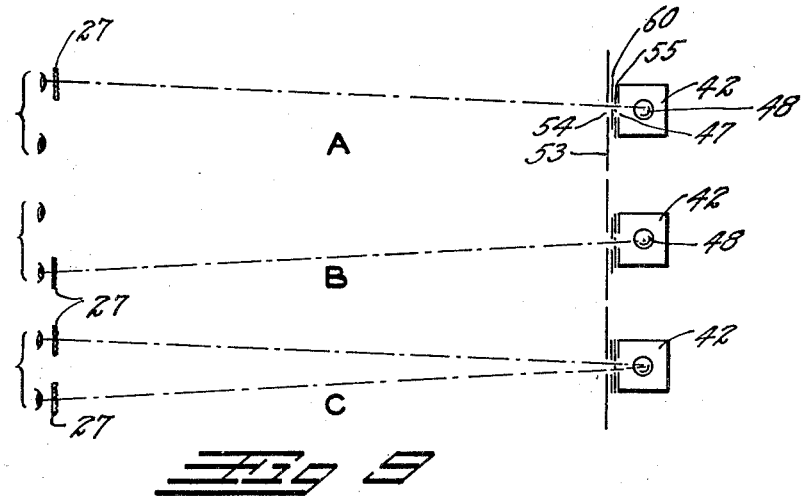
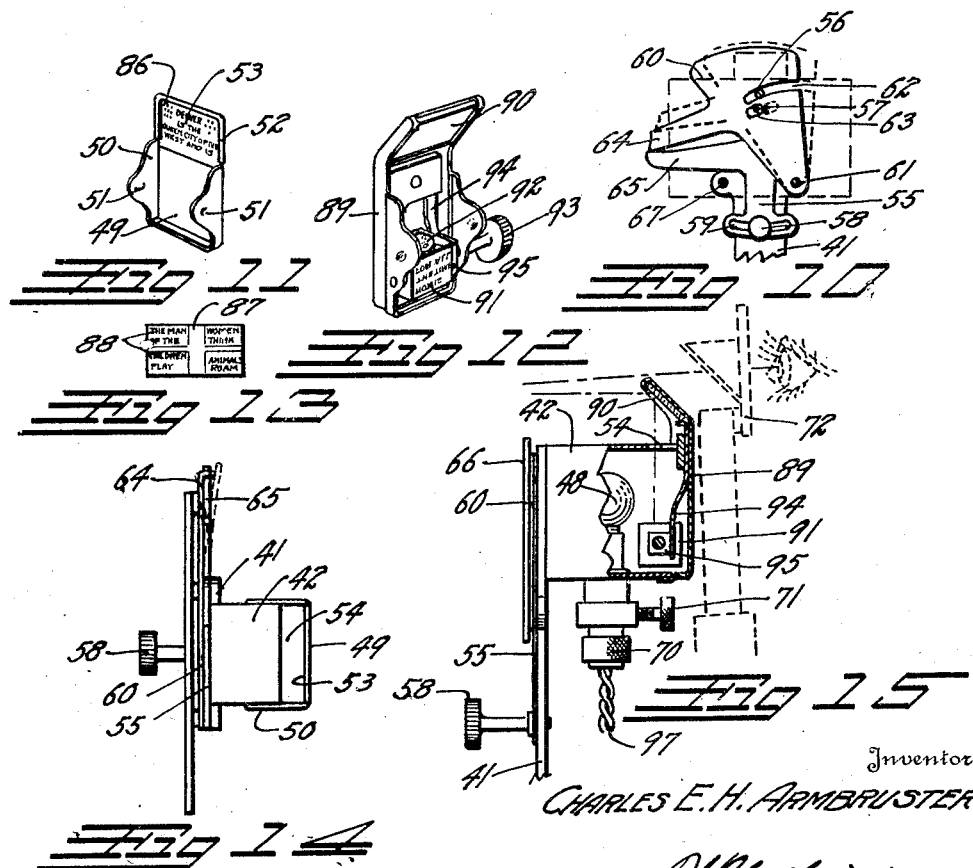
Inventor
CHARLES E. H. ARMBRUSTER
By
Attorney Patented Jan. 31, 1928.

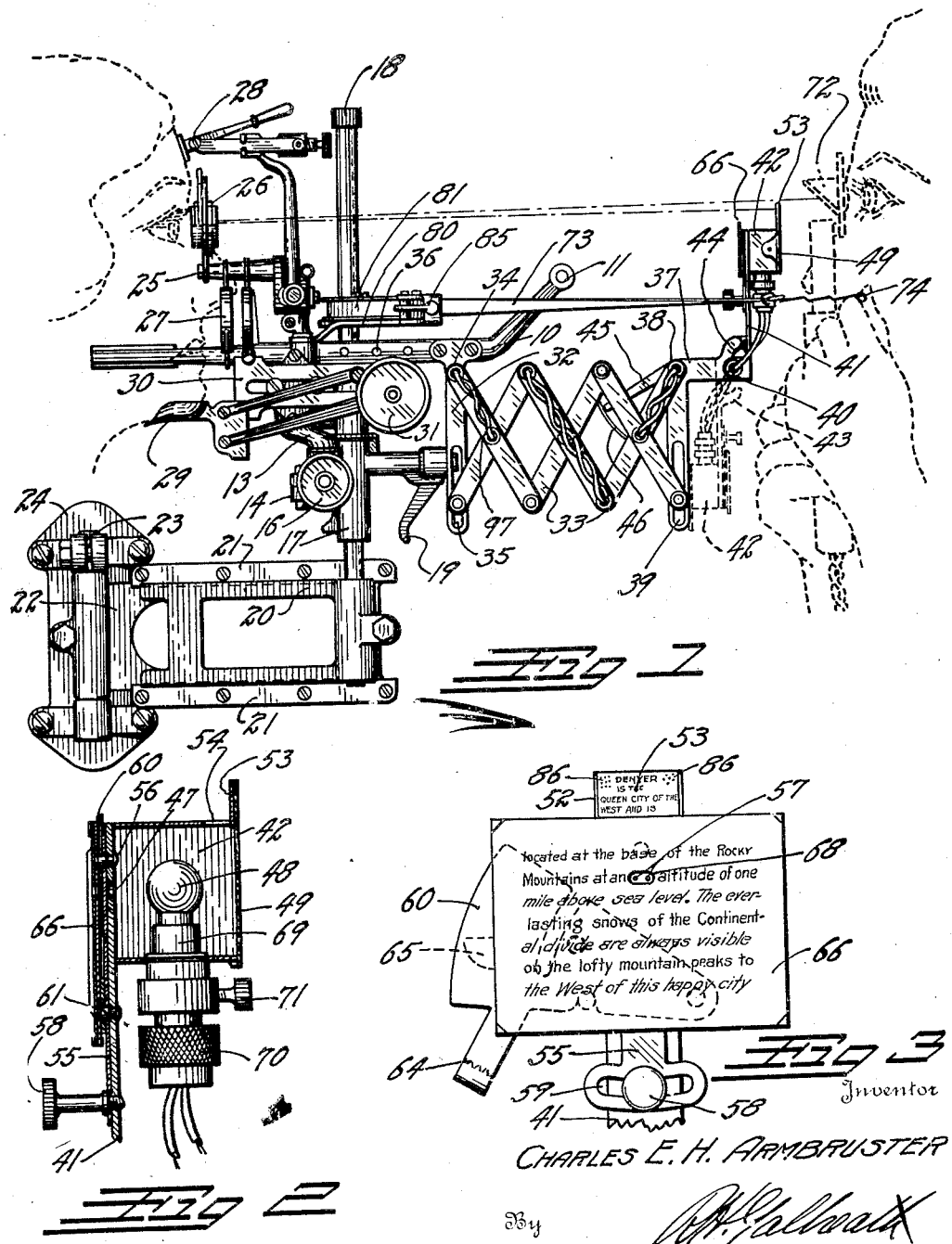

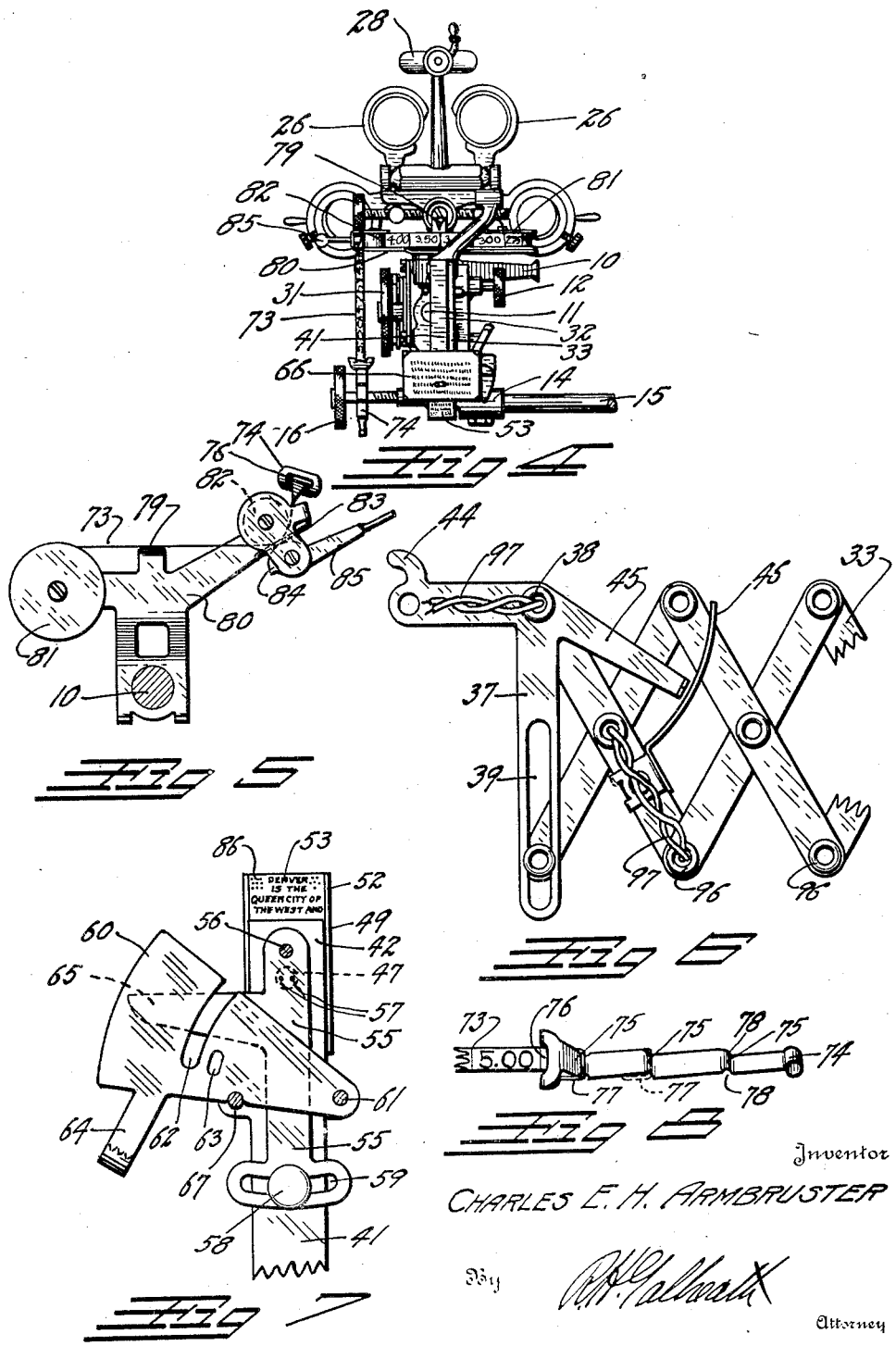

1,657,601

UNITED STATES PATENT OFFICE.

CHARLES E. H. ARMBRUSTER, OF DENVER, COLORADO.

DYNAMIC PHOROPTOMETER.

Application filed May 24, 1926. Serial No. 111,256.

This invention relates to dynamic phoroptometers, that is, a device for measuring the refractions of the human eye when focused upon near objects and for testing the eye muscles. The principal object of the invention is to provide a device of this character in which the amount of accommodative lag or distance between the work and the perfect focus point can be quickly and accurately determined.

Another object is to provide a series of accessible, quick operating adjustments which will be within ready reach of the operator during the test.

Another object is to provide a carrier for the test chart which will allow the chart to be readily placed at various distances and which will indicate to the operator the distance between the chart and the patient's eyes.

Still another object is to provide a test chart which will allow the operator's line of vision to be substantially coincident with the patient's line of vision.

A further object is to combine a reading chart with a point of light for use with a Maddox rod so that the attention of the patient may be held and the eyes placed in dynamic condition for making muscle tests.

A still further object is to provide a mechanism which will project a beam of light into either eye for the Maddox rod test while the other eye is at work and prevent the beams entering the remaining eye and confusing the patient. The means can be so constructed that should it be desired for cyclo-duction tests, a beam can be projected into both eyes simultaneously.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a side elevation of the complete mechanism illustrating it in use. In this view the inoperative position of the light box and reading charts is illustrated in broken line.

Fig. 2 is a vertical section through the light box and reading chart.

Fig. 3 is a face view of the light box and reading chart.

Fig. 4 is a front elevation of the device. This view is taken looking from the operator's position and in it the reading chart is in the inoperative position.

Fig. 5 is a detail view of the measuring tape attachment for measuring the distance between the patient's eye and the operator's eye.

Fig. 6 is a detail view of one extremity of the lazy tongs employed for supporting the light box illustrating the distance meter employed thereon.

Fig. 7 is a front elevation of the light box with the secondary reading chart removed.

Fig. 8 is a detail view of the tape terminal.

Fig. 9 illustrates in diagram the operation of the light box; at A the light is being projected into the patient's left eye; at B into the right eye; and at C into both eyes.

Fig. 10 is a detail view illustrating the operation of the light shield on the light box.

Fig. 11 is a detail view of the method of carrying the primary reading chart.

Fig. 12 illustrates an alternate form of the primary reading chart in which the characters are changeable while the device is in operation and which allows the operator's eye to be at the exact reading chart distance.

Fig. 13 is an alternate form of reading chart to be used in connection with the holder of Fig. 11.

Fig. 14 is a plan view of the light box and reading charts of the form shown in Fig. 1.

Fig. 15 is a detail view illustrating a side elevation of the light box partially broken away to show the use of the secondary reading chart of Fig. 12.

The main supporting mechanism and frame of this invention is similar to that disclosed in applicant's copending application for a macular reflectoscope, Serial No. 111,257, filed May 24, 1926, and comprises a main frame 10, the extremities of which, when the device is used as a reflectoscope, support suitable mirrors as illustrated in said co-pending application but which are not illustrated and not used when the device is employed as a dynamic optometer or a phorometer.

The main frame 10 is carried on a horizontal pivot 11 about which the horizontal angle of the device may be adjusted by means of an adjusting screw 12. The pivot 11 is carried on a supporting bracket 13 which is carried on a vertical pivot in a collar 14 at the extremity of a supporting arm 15. The supporting bracket 13 is locked in its pivot in the collar 14 by means of a clamp screw 16. The supporting arm 15 is carried in a supporting arm bracket 17 vertically slidable upon a column 18. The supporting arm bracket 17 may be set at any desired height on the column 18 by the manipulation of a lever 19. The column 18 is carried in a carriage 20 slidably mounted between tracks 21 of a base frame 22. The base frame 22 is pivoted at 23 in a base 24 which supports the entire device from the wall of the room or any suitable supporting structure. Upon the main frame 10, a trial frame 25 is mounted, carrying a series of the usual lens frames 26 and Maddox rod frames 27. An adjustable forehead rest 28 is mounted above the trial frame 25 and an adjustable chin rest 29 is mounted therebelow. The chin rest 29 is vertically movable on a chin rest frame 30 by means of an adjusting wheel 31. The chin rest frame 30 is horizontally slidable on the supporting bracket 13.

As thus far described, the apparatus is similar to that illustrated, disclosed and claimed in the said copending application. In that application, the operation of the various adjustments for the main frame 10, the forehead rest 28 and chin rest 29 are described in detail.

Depending from the main frame 10 is a lazy tongs support 32, to which, a lazy tongs 33 is pivoted at 34, the lower member of said tongs being vertically slidable in a groove 35. The lazy tongs 33 comprise a series of crossed members pivoted together by means of eyelets 96. To accommodate different depths of trial frames, the support 32 may be secured at any desired position along the main frame 10 in any pair of a series of holes 36. The lazy tongs 33 terminate in a light box frame 37 at a pivot 38 and in a groove 39. Pivoted on the light box frame 37 at 40, is a leg 41 which supports a light box 42. The leg 41 has a resilient projecting tongue 43 which engages a similar tongue 44 on the light box frame 37 so as to securely maintain the leg 41 in the vertical or operative position. When not in use, the leg 41 may be turned downwardly to the broken line position of Fig. 1.

A fixed indicating hand 45 is formed on the light box frame 37 and indicates, on a scale 46, the distance between the light box and the eye of the patient. The scale 46 is secured to one of the members of the lazy tongs 33 and swings in an arc about the pivot 38, from which the hand 45 extends, as the lazy tongs are extended or contracted.

The leg 41 forms the forward face of the light box 42 and is provided with a relatively large aperture 47 immediately in front of the filament of an electric lamp 48 which is positioned within the light box. Current is fed to the lamp 48 by means of a flexible wire 97 which is passed through the eyelets 96 of the lazy tongs. The position of the lamp 48 may be readily adjusted to bring its filament in alignment with the aperture 47 as it is carried in a rotatable and vertically slidable socket 69 having a knurled finger hold 70. The socket may be locked in the adjusted position by means of a set screw 71.

The rear face of the light box is detachable and is illustrated in detail in Fig. 11. It is maintained in place by ears 50 which engage opposite sides of the light box and have indentations 51 which enter similar indentations in the light box sides. The rear face 49 extends upwardly above the top of the light box and is provided at each side with an inwardly turned flange 52 which slidably maintain a relatively small primary reading chart 53 in place. In the top of the light box, an opening 54 is left through which light from the lamp 48 illuminates the face of the chart 53.

In front of the aperture 47, an aperture plate 55 is maintained suspended from a pivot 56, and may be locked in any desired position about its pivot 56 by means of a clamp screw 58 which rides in a slot 59 in the aperture plate and is threaded into the leg 41. The aperture plate is provided, immediately in front of the aperture 47, with two exceedingly small perforations 57. These perforations are spaced so that when the light box is a given distance from the patient, a beam of light from the lamp 48 will strike each of the patient's eyes.

In front of the aperture plate 55, a sector-shaped shield 60 is pivoted at 61. In the shield 60, a notch 62 is formed to ride over the pivot 56. The depth of the notch 62 acts to limit the arcuate movement of the shield 60 in one direction. The movement in the other direction is limited by a resilient operating arm 64 which engages a projecting arm 65 on the aperture plate 55. This, however, is but a temporary stop since the arms 64 and 65 may be sprung, as indicated in broken line in Fig. 14, to disengage the arm 65 and allow the shield to move to the position of Fig. 7. At the point where the shield 60 passes over the perforations 57, a slit 63 is formed of sufficient length to uncover both perforations 57 simultaneously, when in one position; to uncover the right hand perforation when the pivot 56 is at the extremity of the notch 62, as indicated in broken line in Fig. 10; and to uncover the left hand perforation when the arms 64 and 65 are in engagement, as indicated in solid line in the same figure.

A secondary reading chart 66 is carried on the pivot pins 56, 61, and a third pin 67, immediately in front of the shield 60. In the reading chart 66, a slit 68 is formed which uncovers both the perforations 57, the use of which will be later described.

Secured to the frame 10 is a tape line support 80 carrying a spring reel 81 arranged to reel a tape line 73. The tape line passes in front of an indicator 79 and over an idler pulley 82. The support 80 is formed of relatively thin sheet metal and has a tongue 83 bent to pass alongside of the pulley 82. A cam 84 is arranged adjacent the pulley 82 and is actuated from a cam lever 85 to force the tongue 83 against the pulley 82 and clamp the tape therebetween. The extremity of the tape line 73 engages a metal terminal 74 which is offset, as indicated at 75 at fixed distances throughout its length. These distances correspond to the differences in depths in different makes of trial frames 25. The extremity of the tape line 73 passes through an opening 76 in the terminal 74 and terminates in a rectangular link 77. Should one of the shallowest of trial frames be in place upon the apparatus, the link 77 is drawn along the terminal 74 and placed in notches 78 formed in the offset nearest the extremity of the terminal 74. For other depths of trial frames, the link engages other offsets on the terminal. By this arrangement the operator does not have to make a mental computation for the depth of the trial frame. The reading at the indicator 79 on the tape 73 will be correct at all times. The operator may retain the tape reading by clamping the tape by means of the lever 85, for future reference.

In use, the patient is placed behind the trial frames 25 and the chin and forehead rests adjusted to bring the line of sight to the center of the lens frames 26. The lazy tongs 33 are extended or contracted to bring the reading chart 53 at the proper distance for reading lenses to be prescribed, the distance being quickly determined by the hand 45 and the scale 46. The patient is now directed to read the primary reading chart 53 which is illuminated by the lamp 48 and the operator proceeds to make a retinoscopic examination by means of a retinoscope, illustrated in broken lines at 72. Owing to the very small size of the chart 53, the operator's line of vision will be at all times at a negligible angle to the patient's line of vision so that an accurate measure may be made.

The small reading chart 53 is provided at its two upper corners with series of dots 86. Should the operator, for a final check, desire to place his line of vision as closely as possible to that of the patient, he may request the patient to count the number of dots in one of the series 86 and then align his retinoscope with the corner containing the designated series. The chart 53 may be easily slid from the rear face 49 of the light box and replaced by any suitable chart. A novel chart for this purpose is illustrated at 87 in Fig. 13, which contains a section of reading matter 88 in each of its corners. The section in each corner differs in subject matter so that as the patient audibly reads the chart, the operator will know at which portion of the chart the patient is looking and may then place his retinoscope immediately behind that portion so as to directly align his line of vision with that of the patient.

The patient, in reading the matter on the primary chart 53 does not focus truly on the chart, since it is natural with all eyes to only focus sufficiently to make the subject matter legible. The majority of eyes will focus beyond or at a greater distance than the reading chart, the distance between the chart and the true focus is known as accommodative lag and if not beyond a given distance, it is termed normal lag. If the patient is found to exceed this normal lag, he requires additional lens strength to bring his focus to the position of normal lag. In rare instances the patient's true focus may be in front of the chart which is also a significant condition.

To find the patient's true focal point, the operator with the retinoscope 72, first takes a position immediately behind the reading chart 53 and throws the retinoscopic light into the eye of the patient. The operator then slowly moves backwardly away from the chart and patient, until the true focal point is found. He then measures the distance between the patient's eye and his, by means of the tape line 73, to find the true focus. The operator now compares the tape indication with the measurement shown on the scale 46 and immediately determines the difference between the true focal point and the patient's fixation point which gives him the amount of accommodative lag.

It is customary to refer to a patient's reading distance in inches, therefore the scale 46 is graduated in inches. Because of the ease and accuracy of the dioptric system in adding and subtracting, the tape line 73 is graduated in diopters. These graduations, however, are optional and may be fixed to suit the personal habits of the operator.

An alternate form of rear face for the light box is illustrated at 89, Fig. 12. In this form, a mirror 90 is placed at an angle to the reading matter, which is carried on a rotatable cube 91, so that the operator may have his eye at the exact or even at a closer distance than the distance between the patient and reading matter. In this form, the operator aligns his line of vision directly over the top of the mirror as illustrated in Fig. 15.

It is often difficult to keep a patient's attention concentrated on the matter on the reading chart during a test, especially in the case of children. The rotatable cube 91 helps to eliminate this difficulty since a series of different subjects and characters 92 may be placed on the sides of the cube and the cube rotated by means of a handle 93 to successively bring the various characters and reading matter to the attention of the patient. A leaf spring 94 is caused to bear upon a rectangular ratchet 95 on the cube shaft to align the cube faces and hold it in any desired position.

When using the apparatus as a phorometer, the secondary reading chart 66 is employed. Let us assume that one of the Maddox frames 27 is placed before the left eye of the patient, as indicated in diagram "A" in Fig. 9. The shield 60 is now brought to the solid line position of Fig. 10 which allows a narrow beam of light to be projected through the left hand perforation 57 through the Maddox rod and into the patient's left eye, the upper part of the shield covering the primary reading chart 53. The usual muscle test is now made for the left eye. The Maddox rod is now removed from the left eye and placed before the right eye, as indicated at "B", Fig. 9, and the shield 60 moved to the broken line position of Fig. 10. This allows the light beam to project through the right hand perforation and the Maddox rod into the right eye of the patient for the muscle test thereon.

Should there be difficulty in keeping the patient's attention or having him concentrate and focus, he is directed to read the matter on the secondary test chart 66 and when he reaches a position therein at the opening 68, he is directed to inform the operator of the position in which he sees the red line of the Maddox rod.

For testing the powers of cyclo-duction or the oblique muscle of the eye, a Maddox rod is placed before each eye, as shown at "C", Fig. 9, and the shield 60 moved to a position between the two positions previously described so that light beams will be projected through both perforations into both eyes. During all of the muscle tests, the same light is used as employed to illuminate the primary test chart 53 but the test chart is concealed from the view of the patient by the shield 60 and only the light from the perforations 57 is allowed to enter his eye.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. In a dynamic phoroptometer having a frame for carrying test lenses before a patient; an extendible bracket secured to said frame; a light box carried by said bracket; a test chart carried forward of said light box; and a second test chart of relatively smaller size projecting above said light box and adapted to be illuminated therefrom.

2. In a dynamic phoroptometer having a frame for carrying test lenses before a patient; an extendible bracket secured to said frame; a light box carried by said bracket; a test chart adapted to be illuminated from said light box; and a series of characters placed in localized relation adjacent the corners of said chart and independent from the remaining matter on said chart.

3. In a dynamic phoroptometer having a frame for carrying test lenses before a patient; an extendible bracket secured to said frame; a light box carried by said bracket; a detachable back on said light box adapted to extend thereabove; and a test chart carried by said above-extending portion of said back and adapted to be illuminated from said light box.

4. In a dynamic phoroptometer having a frame for carrying test lenses before a patient; an extendible bracket secured to said frame; a light box carried by said bracket; a detachable back on said light box adapted to extend thereabove; a test chart carried by said above-extending portion of said back and adapted to be illuminated from said light box; and ears formed on said back and adapted to clamp said light box to maintain said back in place.

5. In a dynamic phoroptometer a single light source; means provided with two relatively small, horizontally aligned, spaced apart apertures adapted to be arranged between said single light source and the eyes of a patient, the spacing of said apertures being such that one of said apertures will be in alignment between said single light source and one of the patient's eyes while the other aperture is in alignment between said single light source and the other of the patient's eyes.

6. In a dynamic phoroptometer a single light source, means provided with two relatively small, horizontally aligned, spaced apart apertures adapted to be arranged between said single light source and the eyes of a patient, each of said apertures being in alignment between said light source and one of the patient's eyes; and a shield having an opening arranged to open either one or both of said apertures as desired.

7. In a dynamic phoroptometer a light source; means provided with two relatively small apertures arranged between said light source and a patient, each of said apertures being in alignment between said light source and one of the patient's eyes; means for closing either one or both of said apertures as desired; and a reading chart surrounding said apertures.

8. In a dynamic phoroptometer; a light source; a light box surrounding said light source; and provided with apertures in alignment with the eyes of a patient; and a pivoted shield having an opening adapted to open either one or both of said apertures as desired.

9. In a dynamic phoroptometer for use in examining the eyes of a patient, a light box; a test chart adapted to be illuminated from said light box, said light box having two apertures each adapted to allow light to flow from said light box into one of the patient's eyes; a movable shield adapted to open either one or both of said apertures, said shield arranged to shut off the view of said test chart from said patient when said apertures are open.

10. In a dynamic phoroptometer means for projecting a beam of light from a light source through a Maddox rod into a patient's eye comprising an aperture plate adjustably mounted before said light source; a perforation in said plate in alignment between said light source and one of the patient's eyes; a second perforation in said plate in alignment between said light source and the other of the patient's eyes; and a movable shield adjacent said aperture plate and having an opening arranged to open either one or both of said perforations.

11. In a dynamic phoroptometer means for projecting a beam of light from a light source through a Maddox rod into a patient's eye comprising an aperture plate adjustably mounted before said light source; a perforation in said plate in alignment between said light source and one of the patient's eyes; a second perforation in said plate in alignment between said light source and the other of the patient's eyes; a movable shield adjacent said aperture plate and having an opening arranged to open either one or both of said perforations; and means for limiting the movement of said shield when said opening is over either one of said perforations.

12. In a dynamic phoroptometer means for projecting a beam of light from a light source through a Maddox rod into a patient's eye comprising an aperture plate adjustably mounted before said light source; a perforation in said plate in alignment between said light source and one of the patient's eyes; a second perforation in said plate in alignment between said light source and the other of the patient's eyes; a shield pivoted adjacent said aperture plate and having an opening arranged to open either one or both of said perforations; means for limiting the movement of said shield when said opening is over either one of said perforations, said means comprising an arm on said aperture plate arranged to engage a projection on said shield; and a slot in said shield adapted to engage the pivot of said aperture plate.

13. In a dynamic phoroptometer means for projecting a beam of light from a light source through a Maddox rod into a patient's eye comprising an aperture plate adjustably mounted before said light source; a perforation in said plate in alignment between said light source and one of the patient's eyes; a second perforation in said plate in alignment between said light source and the other of the patient's eyes; a movable shield adjacent said aperture plate and having an opening arranged to open either one or both of said perforations; and a test chart secured before said aperture plate and having an opening adapted to expose both said apertures.

14. In a dynamic phoroptometer having a main frame supporting a test frame and a test chart, means for varying the distance between said test chart and said test frame comprising an extendible support attached to said main frame and carrying said test chart, said support comprising a series of pivoted links; and means for varying the point of attachment of said extendible frame to accommodate different depths of test frames.

15. In a dynamic phoroptometer having a test frame and means for indicating the distance between an operator and his patient; means for accounting for different depths in said test frame in the measurement of said tape comprising a terminal for said tape; and means on said terminal for securing the tape extremity at different relative longitudinal positions thereon.

16. In a dynamic phoroptometer having a light box; a back on said light box extending above the top thereof, there being an opening in said top and a test chart carried by said above extending portion of said back so as to be illuminated by the light through said opening.

In testimony whereof, I affix my signature.

CHARLES E. H. ARMBRUSTER.